(12) United States Patent
Varadi et al.

(10) Patent No.: US 8,906,230 B2
(45) Date of Patent: Dec. 9, 2014

(54) APPARATUS FOR TREATING A WASTE STREAM

(71) Applicant: Merichem Company, Houston, TX (US)

(72) Inventors: Tom Varadi, Houston, TX (US); Marie-Cecile Medine, Houston, TX (US); Arturo Ramon Puigbo, Pearland, TX (US); Ramiro G. Vazquez, Houston, TX (US); Tiejun Zhang, Bellaire, TX (US); James F. McGehee, Houston, TX (US)

(73) Assignee: Merichem Company, Houston, TX (US)

( * ) Notice: Subject to any disclaimer, the term of this patent is extended or adjusted under 35 U.S.C. 154(b) by 166 days.

(21) Appl. No.: 13/621,979

(22) Filed: Sep. 18, 2012

(65) Prior Publication Data

US 2013/0020239 A1 Jan. 24, 2013

Related U.S. Application Data

(63) Continuation-in-part of application No. 12/766,874, filed on Apr. 24, 2010, now Pat. No. 8,298,429, which is a continuation of application No. 12/313,431, filed on Nov. 20, 2008, now Pat. No. 7,828,962.

(51) Int. Cl.
*C02F 1/20* (2006.01)
*C02F 1/40* (2006.01)
*C02F 1/66* (2006.01)
*B01D 17/032* (2006.01)
*B01D 17/02* (2006.01)
*C02F 103/36* (2006.01)

(52) U.S. Cl.
CPC ............... *B01D 17/0214* (2013.01); *C02F 1/66* (2013.01); *C02F 1/20* (2013.01); *C02F 2209/06* (2013.01); *C02F 2103/365* (2013.01)
USPC .......... 210/96.1; 210/188; 210/202; 210/205; 210/218; 210/219; 210/259; 210/260; 210/261; 210/262; 210/522; 96/202

(58) Field of Classification Search
CPC .............. C02F 1/006; C02F 1/20; C02F 1/40; C02F 1/66; C02F 2103/365; C02F 2103/06; C02F 2209/06; B01D 17/02; B01D 17/028; B01D 17/0211; B01D 17/0214
USPC ........ 210/96.1, 188, 202, 205, 218, 219, 259, 210/260, 261, 262, 522; 96/202
See application file for complete search history.

(56) References Cited

U.S. PATENT DOCUMENTS

2010/0122950 A1* 5/2010 Varadi et al. ............... 210/188

* cited by examiner

*Primary Examiner* — Lucas Stelling
(74) *Attorney, Agent, or Firm* — McDonnell Boehnen Hulbert & Berghoff LLP

(57) ABSTRACT

An integrated unit operations for the treatment of a waste stream, such as spent caustic, is provided in a single vertical vessel having at least three separate zones: a mixing, a settling, and a mass transfer zone.

9 Claims, 3 Drawing Sheets

APPARATUS FOR TREATING A WASTE STREAM

CROSS REFERENCE TO RELATED APPLICATIONS

The present application is a continuation-in-part of U.S. application Ser. No. 12/766,874, filed on Apr. 24, 2010, which is a continuation of U.S. application Ser. No. 12/313,431, filed on Nov. 20, 2008, now U.S. Pat. No. 7,828,962. The entire disclosure contents of these applications are herewith incorporated by reference into the present application.

FIELD OF THE INVENTION

This invention relates to a new equipment design for treating spent waste streams, specifically spent caustic streams recovered in a petroleum refining or petrochemical processes. As opposed to prior treatment processes our invention is a deep neutralization or deep acidification process that use a number of separate vessels, our invention uses a single vertical column divided into at least three distinct zones; a mixing zone, a settling zone and a mass transfer zone.

BACKGROUND

In petroleum refining and in petrochemical processing, hydrocarbon conversion products often are scrubbed with caustic solution. In petrochemical processing, for example, such scrubbing removes hydrogen sulfide and carbon dioxide primarily as sodium sulfide, sodium carbonate and sodium bicarbonate, and also removes some of the higher molecular weight hydrocarbon constituents. Caustic solution can be used to remove naphthenic acids and other organic acids, as well as other sulfur compounds from cracked petroleum products and petroleum distillate. However, because caustic solutions are quite harmful to organic tissue, extreme care must be taken in the use and disposal of the spent caustic solutions to protect waterways, rivers, subterranean water formations, and the like. Such spent caustic solutions often are unsuitable for direct treatment in biological wastewater treatment plants because of such factors as high pH and incompatibly high levels of biochemical oxygen demand (BOD), chemical oxygen demand (COD), and total organic carbon (TOC).

Several methods have been proposed to dispose of spent caustic. Among these are wet air oxidation, chemical oxidation, and incineration. In each of these known processes numerous pieces of equipment are needed to complete the treatment process. Such processes are capital intensive because of the number of separate process vessels involved. Likewise, such processes require a large footprint of real estate to accommodate the numerous separate pieces of equipment. Our invention has solved these problems by performing the treatment process in a single vertical column that is divided into at least three process zones. Such an apparatus and associated process represents an extremely economical method of treating waste streams, in particular spent caustic, and consequently, minimizing capital and operating costs. These and other advantages will become evident from the following more detailed description of the invention.

SUMMARY

Our invention relates to an integrated treatment vessel for treating waste streams comprising, in combination, a vertical column having an interior divided into at least a mixing zone, a settling zone and a mass transfer zone. A waste stream inlet is connected to the column for introduction of the waste stream, such as spent caustic, to the mixing zone where it is mixed with a neutralizing agent, such as a strong acid like sulfuric acid. The neutralizing agent maybe added in-line directly to the waste stream and upstream of the inlet or added separately to the mixing zone. There is an off-gas outlet on the vessel that is in fluid communication with the mixing zone to vent $N_2$, $H_2S$, RSH, light hydrocarbons. An organic stream outlet in liquid communication with the settling zone is needed to remove separated acid oils, such as naphthenic acids, DSO, cresylic acids, and entrained hydrocarbon. Connecting the settling zone with the mass transfer zone is a liquid transfer line and connecting the mass transfer zone to the settling zone is a vapor line. An inert gas inlet is in fluid communication with the mass transfer zone in order to strip out the bulk of acid gases present. Finally, the treated waste is removed via an outlet that is in liquid communication with the bottom of the mass transfer zone.

In another aspect of our invention the integrated treatment vessel for treating liquid waste comprises a vertical column having an interior divided into at least a mixing zone, a settling zone and a mass transfer zone, where the settling zone is divided into to at least two subzones, for example, subzone A and subzone B. The liquid waste stream inlet is fed into the mixing zone. There is an off gas outlet in communication with the mixing zone to remove any stripping gas that might have been introduced into the mass transfer zone. An organic stream outlet removes liquid organics that separate from the aqueous phase in subzone A of the settling zone. This removed organic stream, which typically comprises acid oils, is sent for further treatment. There is also a liquid outlet from subzone A, which typically comprises the aqueous phase separated from the organic phase in subzone A. This aqueous liquid that is removed from subzone A is mixed with a solvent stream entering from a solvent line comprising fresh solvent. This admixture of solvent and the aqueous liquid removed from subzone A is further mixed using a mixing means selected from the group consisting of a powered impeller, a gas sparger, a static mixer, a mixing valve, and combinations of such means. An aqueous inlet comprising the admixture of solvent and aqueous liquid is in liquid communication with subzone B of the settling zone where a spent solvent is separated and removed through a spent solvent outlet from subzone B. There is a liquid transfer line that connects the subzone B of the settling zone with the mass transfer zone and a vapor line connecting the mass transfer zone to the settling zone. Inert stripping gas is introduced through an inert gas inlet into the mass transfer zone. Finally, a treated waste stream outlet is in liquid communication with the mass transfer zone.

Our invention is characterized in that it reduces capital cost by minimizing piping components, number of stand alone vessels, instrumentation and unit delivery time. These and other aspects of our invention will become more apparent from the detail description of the preferred embodiment contained below.

BRIEF DESCRIPTION OF THE FIGURES

The accompanying Figures schematically illustrates possible embodiments of the waste stream apparatus of our invention.

DETAILED DESCRIPTION

As stated, our invention is directed to a single apparatus that is used for the treatment of a waste stream, preferably the neutralization of spent caustic. One embodiment of that apparatus is illustrated in the accompanying FIG. 1.

Figure 1:
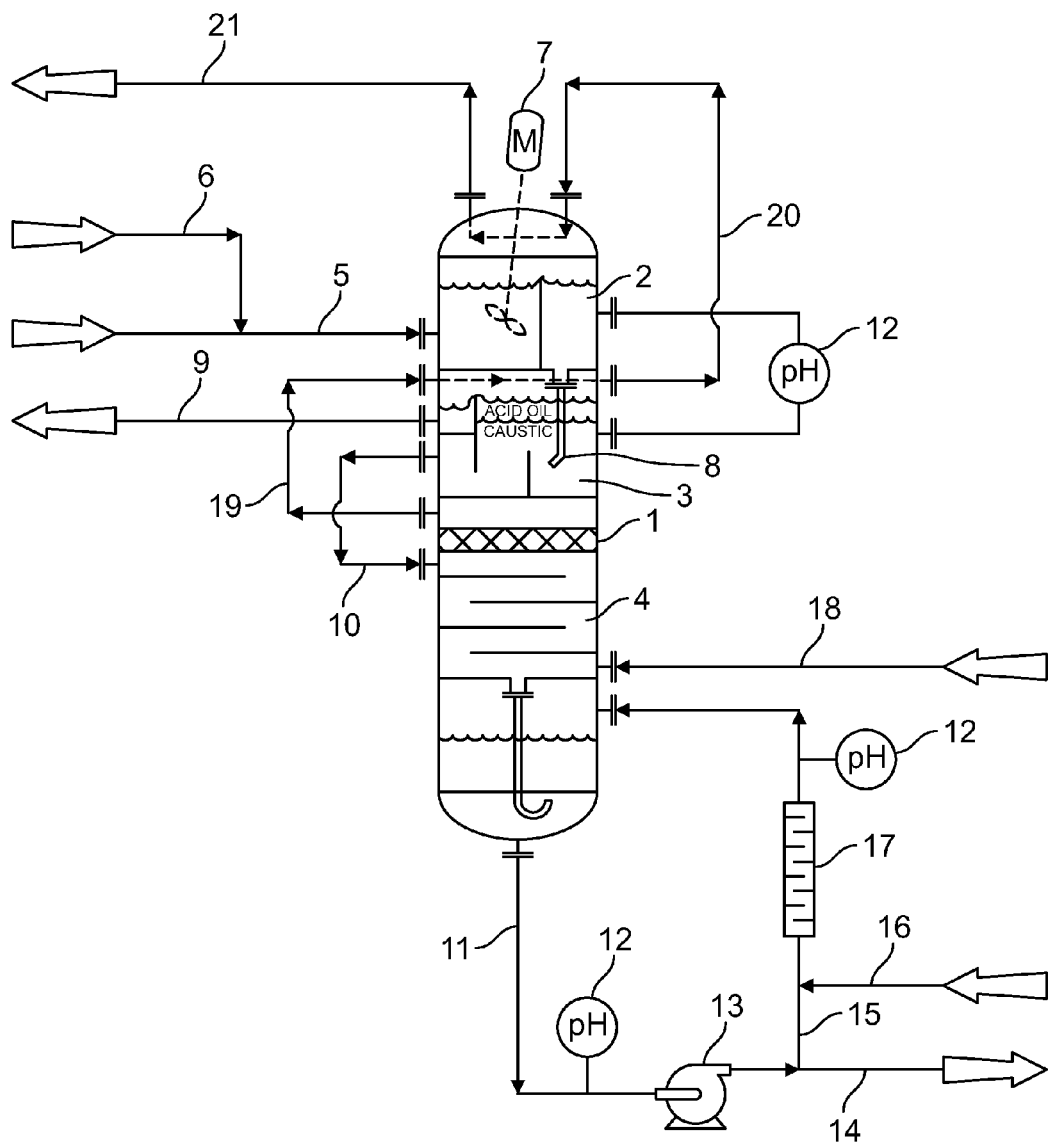
FIG. 1 is cross-sectional view of one embodiment of the waste stream apparatus of our invention.

FIG. 1 shows a vertical column or vessel 1 having at least three separate process zones. Zone 2 is a mixing zone where the waste stream to be treated is thoroughly mixed with a neutralization agent. As mentioned, a preferred process for use in our invention is to treat or neutralize spent caustic from one or more refining or petrochemical processes. The following description of this embodiment will use this type of treatment process as an example. The spent caustic stream enters vessel 1 through inlet 5 and into the mixing zone 2. The spent caustic is typically comprised of 1 to 10 wt % NaOH, 0 to 4 wt % sulfides and bisulfides, 0 to 4 wt % mercaptides as sulfur, 0 to 4 wt % carbonates as CO3, 0 to 5 wt % cresylic acids and 0 to 5 wt % carboxylic acids such as naphthenic acids. A neutralizing agent is also added to mixing zone 2 through neutralization line 6, preferably by adding it directly to the waste stream upstream of inlet 5. Optionally, a mixing device (not shown) selected from the group consisting of a powered impeller, a gas sparger, a static mixer, a mixing valve, and combinations thereof can be used to premix the caustic and neutralizing agent. The amount of neutralizing agent added can be controlled by any means known to the art, however, a convenient method, as shown in the Figure, is to use a pH monitor 12 to measure the pH of the solution in mixing zone 2 and compare it with the pH of the solution in settling zone 3. If the pH is higher than desired, then more neutralizing agent is added to mixing zone 2.

Inside mixing zone 2 is at least one means for thoroughly mixing the waste stream and neutralizing agent. When spent caustic is the waste stream to be treated, then a preferred neutralizing agent is a strong acid, such as, sulfuric acid, however, other acids could be used, such as, hydrochloric acid. The amount of neutralizing agent mixed with the waste stream is selected so that it significantly lowers the pH of the solution so as to facilitate impurity removal by physical means. Preferably, when sulfuric acid is used it is added directly to the spent caustic stream upstream of inlet 5. As shown in the Figure, an impeller type mixer is a preferred mixing means, however, other mixing means known to the art may be used, for example, a gas sparger. The residence time in mixing zone 2 is selected so as to properly mix the acid specified so that the Ph is uniform and the reactions required are 100% achieved. To the extent any volatile hydrocarbons or other gaseous compounds are present in the waste stream they will be removed via off-gas outlet 21 using a sweep gas as described below.

A portion of the mixture from zone 2 is continuously removed via down corner 8 and fed into settling zone 3. This zone allows for the separation of organics from the aqueous components using any known mechanical separation apparatus, for example, the baffles shown in the Figure. Since the organic phase is less dense than the aqueous phase, it can be decanted and removed from vessel 1 via organic outlet 9. When spent caustic is the waste stream being treated, the organic phase consists primarily of acid oils, such as naphthenic acids, DSO, cresylic acids, or entrained hydrocarbon. The aqueous phase in settling zone 3 consists primarily of an acidic brine containing sodium salts and is removed via line 10 and introduced into the top of mass transfer zone 4 where acid gases are stripped out of the brine with an inert gas such as nitrogen. Mass transfer zone 4 can contain any number of known packing materials or design of trays to aid in the stripping of the acidic brine from the aqueous solution. An inert gas, such as nitrogen, is added via inlet 18 to the bottom of mass transfer zone 4 where it flows counter current to the aqueous phase. The inert gas is used to strip $H_2S$, $CO_2$ and other gases from the aqueous phase and is then removed via line 19 where it is used as a sweep gas in the top portion of the settling zone 3 and then is removed via line 20. The sweep gas in line 20 is introduced to the top of the mixing zone 1 and eventually is removed from vessel 1 via off-gas outlet 21.

After being stripped of acid gases the aqueous phase is removed from vessel 1 via line 11 and ultimately from the process via line 14 where it can be disposed of using known methods. Alternatively, as shown in the Figure, a portion of the aqueous phase in line 11 is recycled with the aid of pump 13 via line 15 back to mass transfer zone 4. When a portion of the aqueous phase is recycled it is desirable to add a second neutralizing agent, such as NaOH or KOH, through line 16 followed by contact in a mixing means, such as an in-line static mixture 17 as shown in the figure. To control the addition of the second neutralizing agent, in-line pH meters can be used to monitor the pH of the aqueous phase exiting mass transfer zone 4 via line 11 and then comparing it with the pH in the recycle stream downstream of the mixing means 17.

Figure 2:
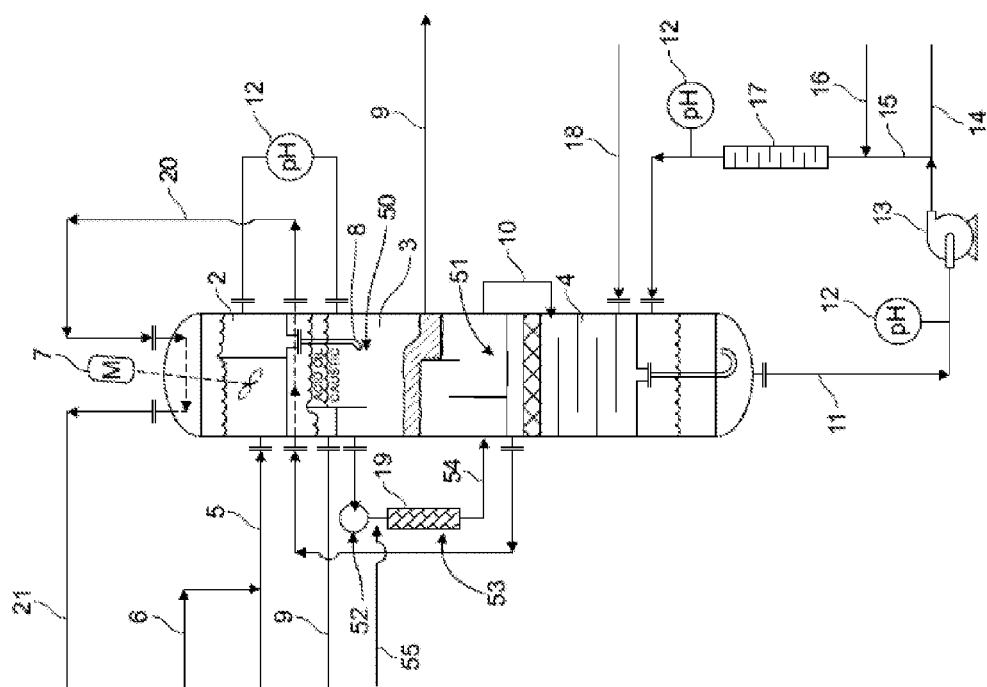
FIG. 2 is cross-sectional view of another embodiment of the waste stream apparatus of our invention.

FIG. 2 illustrates another embodiment of our invention where the settling zone 3 is divided into to at least two subzones, for example, subzone A designated as item 50 and subzone B, item 51. A portion of the mixture from mixing zone 2 is continuously removed via down corner 8 and fed into subzone A of settling zone 3 where organics are allowed to separate from the aqueous phase. The organics form a top layer where a portion is continuously removed typically as acid oils through organic stream outlet 9 and is sent for further treatment. A liquid outlet 60 from subzone A containing an aqueous phase is separated in subzone A, which is removed from subzone A using an optional pump 52 and is mixed with a solvent line 55 containing fresh solvent. If a pump is needed to remove the aqueous phase from subzone A, a preferred pump type would include a positive displacement pump, centrifugal pump or eductor-jet pump. The solvent is fed at a flow rate that is about 0.1 to 10 times that of the aqueous stream removed via outlet 60 on volume basis. The purpose of solvent is to extract the organics that are dissolved in the aqueous phase, thereby further reducing the level of organics in the liquid aqueous phase (typically brine) that settles in subzone B. Preferred possible solvents include hydrocarbon distillates that have negligible solubility in water, but have substantial solubility for phenol and alkylphenols. Examples include naphtha, light naphtha, FCC naphtha etc. In subzone B the spent solvent (containing organics such as phenolics) forms a top layer and is continuously removed through spent solvent outlet 56. The aqueous phase is removed from near the bottom of subzone B via outlet 10 and then enters mass transfer zone 4 for further stripping of organics.

The solvent and the aqueous liquid removed from subzone A is mixed using a mixer 53 selected from the group consisting of a powered impeller, a gas sparger, a static mixer, a mixing valve, and combinations thereof. An aqueous inlet 54 comprising the admixture of solvent and aqueous liquid is in liquid communication with subzone B of the settling zone 3 where a spent solvent is separated and removed through a spent solvent outlet 56 from subzone B. There is a liquid transfer line 10 that connects subzone B of the settling zone with the mass transfer zone 4 and a vapor line 19 connecting the mass transfer zone to the settling zone. Inert stripping gas is introduced through an inert gas inlet 18 into the mass transfer zone where it is used as a sweep gas in the top portion of subzone A of the settling zone 3 and then is removed via line 20. The sweep gas in line 20 is introduced to the top of the mixing zone 1 and eventually is removed from vessel 1 via off-gas outlet 21. Finally, a treated waste stream outlet 11 is in liquid communication with the mass transfer zone 4 to remove the treated liquid waste.

Figure 3:
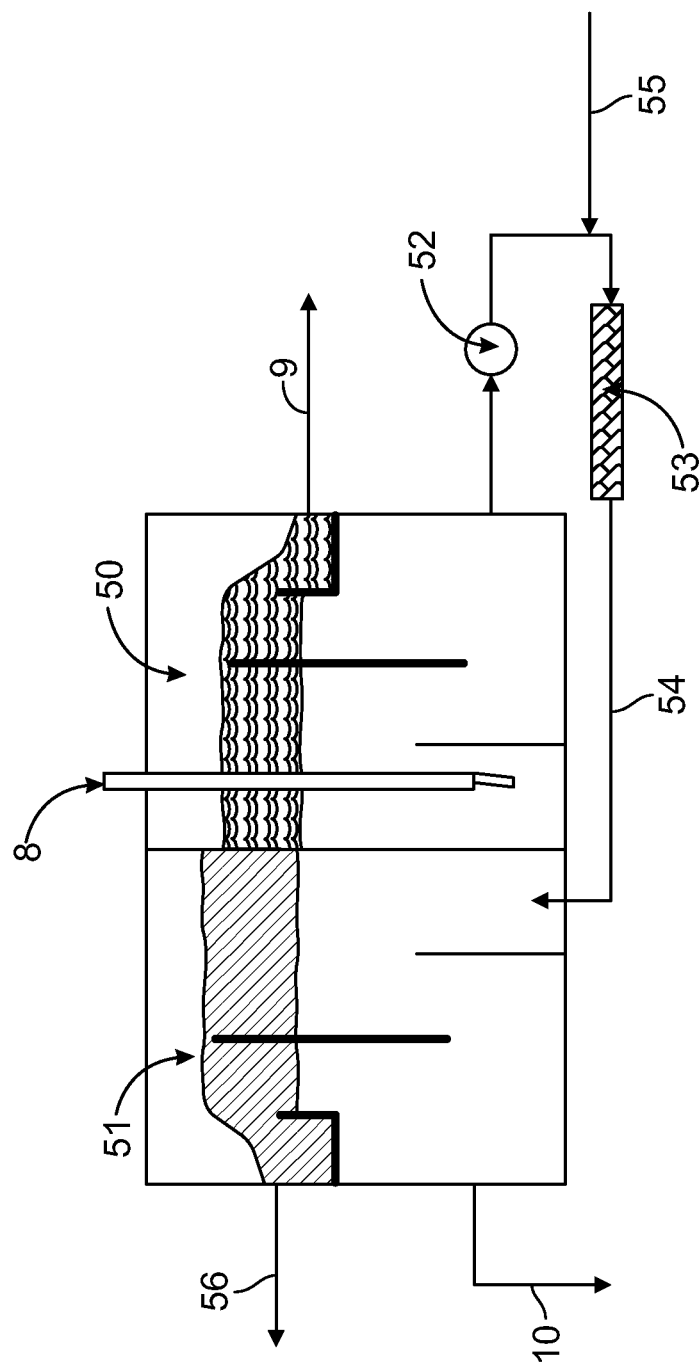
FIG. 3 is an enlarged cross-sectional view of subzone A and subzone B arranged horizontally.

FIG. 3 illustrates yet another embodiment that is similar to that shown in FIG. 2 where subzone A and subzone B are configured horizontally connected as opposed to the vertically stacked configuration shown in FIG. 2. Like reference numerals in FIGS. 1, 2 and 3 each have the same meaning and definition.

Operating temperatures for vessel 1 range from about 20° C. to about 90° C., more preferably from about 30° C. to about 70° C. The internal pressure of vessel 1 can range from about 0 atmosphere gauge to about 1 atmosphere gauge.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation within the terms of the following claims.

The invention claimed is:

1. An integrated treatment vessel for treating a liquid waste streams comprising, in combination,
 a vertical column having an interior divided into at least a mixing zone, a settling zone and a mass transfer zone, where the settling zone comprises subzone A and subzone B;
 a waste stream inlet in liquid communication with the mixing zone;
 an off gas outlet in communication with the mixing zone;
 an organic stream outlet in liquid communication with subzone A of the settling zone;
 a liquid outlet from subzone A of the settling zone in liquid communication with a solvent line;
 an aqueous inlet in liquid communication with subzone B of the settling zone;
 a spent solvent outlet from subzone B;
 a liquid transfer line connecting the subzone B of the settling zone with the mass transfer zone;
 a vapor line connecting the mass transfer zone to the settling zone;
 an inert gas inlet in communication with the mass transfer zone; and
 a treated waste stream outlet in liquid communication with the mass transfer zone.

2. The integrated treatment vessel of claim 1 further characterized in that the waste stream inlet is in liquid communication with a neutralization line.

3. The integrated treatment vessel of claim 1 further characterized in that the liquid outlet and the solvent line are in liquid communication with a mixer.

4. The integrated treatment vessel of claim 3 further characterized in that the mixer is selected from the group consisting of a powered impeller, a gas sparger, a static mixer, a mixing valve, and combinations thereof.

5. The integrated treatment vessel of claim 1 further characterized in that the settling zone has one or more baffles to assist in the separation of aqueous and organic phases.

6. The integrated treatment vessel of claim 1 further characterized in that at least one pH sensor is in communication with the mixing and settling zones in order to assist in controlling addition of neutralization liquid through the neutralization line and into the waste stream inlet.

7. The integrated treatment vessel of claim 1 further characterized in that the mass transfer zone is configured as a stripping column.

8. The integrated treatment vessel of claim 1 further characterized in that the mass transfer zone comprises packing material or one or more trays.

9. The integrated treatment vessel of claim 1 further characterized in that the mass transfer zone has a recycle stream inlet to allow return of a slipstream of treated waste removed from the treated waste stream outlet.

* * * * *